United States Patent [19]
Tazartes et al.

[11] Patent Number: 5,325,173
[45] Date of Patent: Jun. 28, 1994

[54] APPARATUS FOR COMPENSATING FOR CHANGE IN LASER GYRO DITHER PICKOFF SCALE FACTOR

[75] Inventors: Daniel A. Tazartes, West Hills; John G. Mark, Pasadena, both of Calif.

[73] Assignee: Litton Systems, Inc., Woodland Hills, Calif.

[21] Appl. No.: 518,044

[22] Filed: May 4, 1990

[51] Int. Cl.⁵ .......................... G01B 9/02; H01S 3/083
[52] U.S. Cl. ........................................ 356/350; 372/94
[58] Field of Search ........................... 356/350; 372/94

[56] References Cited
U.S. PATENT DOCUMENTS

| | | | |
|---|---|---|---|
| 4,795,259 | 1/1989 | Egli et al. | 356/350 |
| 4,981,359 | 1/1991 | Tazartes et al. | 356/350 |

*Primary Examiner*—Stephen C. Buczinski
*Attorney, Agent, or Firm*—L. David Rish

[57] ABSTRACT

A dithered ring laser gyroscope is mounted upon a support, and a pickoff is positioned between the gyro and the support to produce signals representative of rotation angle between the support and the gyro. A correction means is used to subtract out the effect of the dither from the output signal to the gyro. The correction means includes feedback means in the correction-producing apparatus. That feedback means includes tracking compensation for both gain and phase variation of the pickoff and pickoff electronics. To prevent constant or slowly varying signals from affecting the operation of the apparatus, the invention uses a differentiator or a high pass filter between the compensated output signal and the feedback loops.

14 Claims, 3 Drawing Sheets

APPARATUS FOR COMPENSATING FOR CHANGE IN LASER GYRO DITHER PICKOFF SCALE FACTOR

BACKGROUND OF THE INVENTION

This invention pertains to a servo means for correcting the output of a ring laser gyro by removing a properly scaled signal from its output signal to compensate for dithering of the gyro.

A frequent technique for using the ring laser is to superimpose a portion of the two counterpropagating beam modes to produce lines or bars that move across the field of an optical sensor. The optical sensor converts the interference lines or bars into electrical signals that are counted. Periodically, the count is latched, and that count is a measure of the incremental rotation angle sensed by the gyro.

When small angular velocities are measured, the beam frequencies of the two counterpropagating beam modes tend to lock together. To avoid mode frequency locking, it is customary to rock or dither the ring laser about its sensing axis. The dither motion between the ring laser and its mount is sensed, and it is subtracted from the total motion sensed by the ring laser gyro to obtain a measure of some external angular motion.

While the gyro is sensing angular motion, a pickoff, for example a magnetic or piezo-electric pickoff, senses the instantaneous angular position of the ring laser relative to the instrument mount. The sensed signal is converted into a digital signal, and it too is latched to get an instantaneous reading of the angular motion of the instrument relative to the instrument support. The difference between the signal from the ring laser and the signal from the pickoff is a measure of the angular motion of the instrument support about the sensor sensing axis relative to inertial space.

Errors are introduced by changing scale factors in the electronics and in the angular pickoff. Electrical, usually electronic, apparatus are used to modify the signals to compensate for such errors. Other approaches include optical detection which is not sensitive to dither motion. A more cost effective approach, which has been used successfully, consists of digital compensation of the gyro output signal using the system computer. The gyro dither pickoff signal is converted to a digital form which is easily manipulated by the computer. The digital signal is appropriately scaled and phase compensated, and it is then subtracted from the digital gyro counts to form a dither compensated signal. Servo loops in the computer track both the gain and phase of the pickoff signal to maintain their compensation. Unfortunately, when the gyro senses low frequency oscillatory angular motions or constant angular motions, a large signal is channeled through the feedback paths of the gain/phase tracking controller. The presence of such large or low frequency signals disturb the pickoff correction parameters, and it can cause the entire system to be unstable, failing to eliminate the interference of the gyro dither in the output signal of the gyro.

BRIEF DESCRIPTION OF THE INVENTION

To prevent low frequency or slowly changing angular motion signals from affecting the correction of the apparatus, it is contemplated by this invention to insert a differentiator or high pass filter between the compensated output signal produced by prior art controllers and the inputs to the feedback loops of the controller channels.

It is therefore a feature and object of this invention to stabilize dither correction controllers used to eliminate dither effects in the output of a ring laser gyro.

It is a more general feature and object of this invention to remove measurable errors from the outputs of such ring laser gyros.

Other objects will become apparent from the following description, taken together with the accompanying drawings.

DETAILED DESCRIPTION OF THE PREFERRED EMBODIMENT

Figure 1:
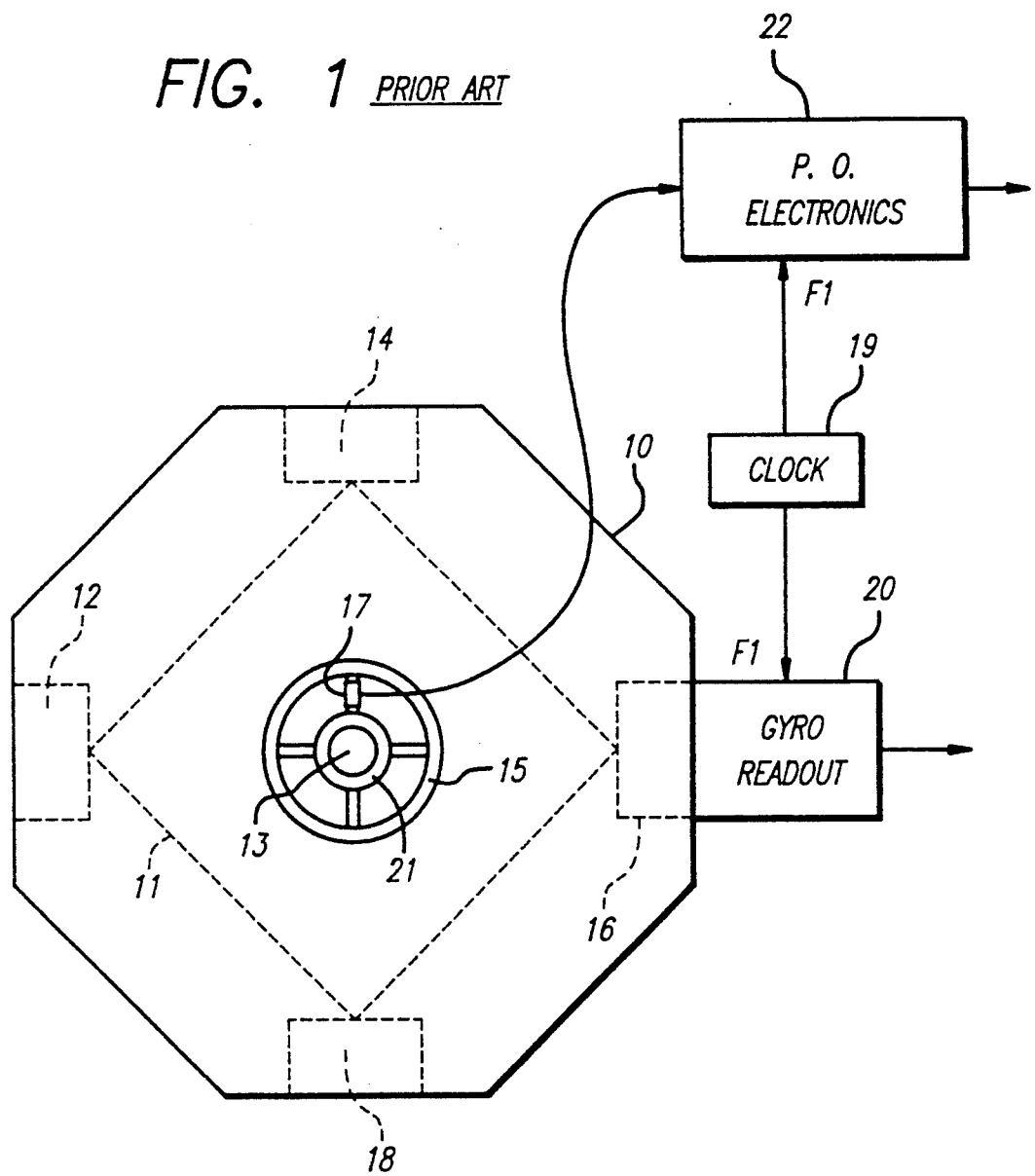
FIG. 1 is a plan of a simple dithered ring laser gyro.

FIG. 1 shows a prior art ring laser gyro having a closed ring laser path 11 from mirror-to-mirror 12, 14, 16, 18 within a gas conduit (not shown), in a rigid gyro block 10. The laser is energized by electrical or electromagnetic means (not shown). One of the mirrors 16 is partly transparent, and the two laser counterpropagating beam modes of the gyro are extracted and combined by optical means (not shown) to produce lines or bars that move across the field of an optical sensor, a series of interference fringes from the induced frequency difference caused by angular motion of the block 10. The fringes are counted in the gyro readout electronics 20, and the count is periodically sampled at the frequency $F_1$. The optical sensor or readout 20 converts the interference lines or bars into electrical signals that are counted. Periodically, the count is latched by a clock signal F1 from clock 19, and that count is a measure of the incremental rotation angle sensed by the gyro. A typical sampling frequency might be 2048 Hz.

To increase the accuracy of the gyro at low sensed angular rates, a dither mechanism (not shown) dithers or oscillates the gyro about its sensing axis relative to a mounting post 13.

The gyro block 10 is mounted on a mechanical dither flexure 21 which fits within the opening 15. The flexure allows a single degree of freedom for angular oscillation about the gyro's sensing axis. The flexure is mounted to the base via a post or pedestal 13. Because of this configuration, it is possible to impart rotation of the gyro block 10 relative to the mounting base. Excitation for the dither motion is generally provided by piezo-electric wafers(not shown). A dither pickoff 17, usually a magnetic or piezo-electric transducer, produces a signal which is a measure of the relative rotation between the gyro block 10 and its support 13. The signal from pickoff 17 is delivered to the pickoff electronics 22.

The pickoff electronics 22 converts the pickoff signal to a digital signal that is sampled periodically upon receipt of the latch signal at frequency $F_1$ from the clock 19. This digital pickoff signal is representative of the angle of rotation between the block 10 and its mounting support 13.

Figure 2:
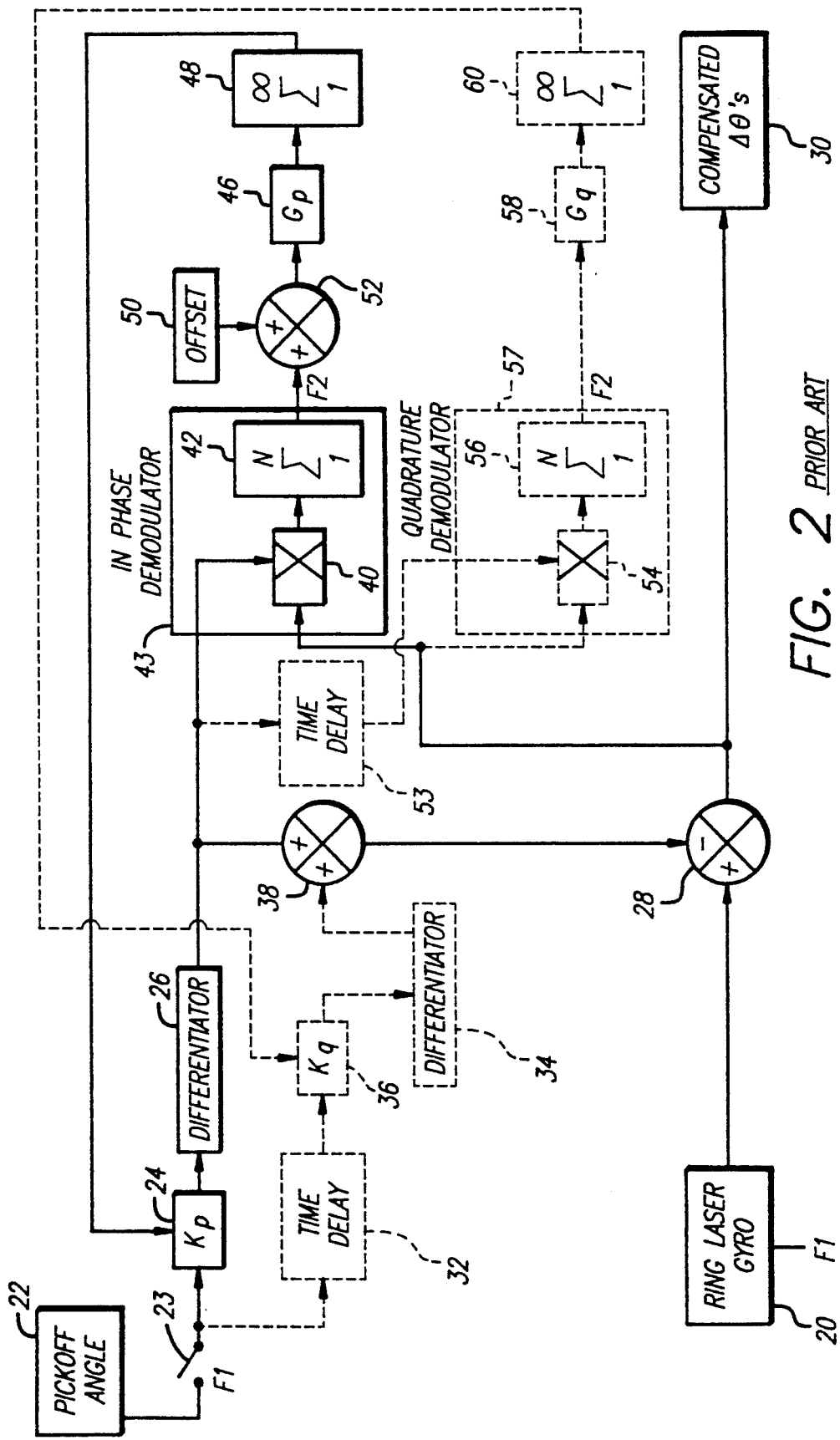
FIG. 2 is a prior art controller for compensating the dither motion in the output of a ring laser gyro.

According to the prior art and FIG. 2, the output of the ring laser gyro pickoff, in digital form, is sampled at the frequency $F_1$ and delivered to the gyro system computer then processed through a digital multiplier 24 followed by a digital differentiator 26 and also, through the time delay 32 and the multiplier 36 followed by the differentiator 34. The outputs of the differentiators 26 and 34 are summed at the summing junction 38, and their sum signal is subtracted digitally from the output of the ring laser gyro 20, sampled at the rate Fl. This subtraction is formed in summer 28. The subtraction produces the compensated output angular signal at 30.

While the gyro is sensing angular motion, a pickoff 17, for example a magnetic or piezo-electric pickoff, senses the instantaneous angular position of the ring laser relative to the instrument mount (not shown). The sensed signal is converted into a digital signal, and it too is latched to get an instantaneous reading of the angular motion of the instrument relative to the instrument support. The difference between the signal from the ring laser 10 and the signal from the pickoff 17 is a measure of the angular motion of the instrument support about the sensor sensing axis relative to inertial space.

Errors are introduced by changing scale factors in the electronics and in the angular pickoff 17. Electrical, usually electronic, apparatus are used to modify the signals to compensate for such errors.

One is interested not only in the amplitude of the dither signal, but also its phase. To obtain that phase, it is useful to obtain two pickoff signals which are in quadrature. That is, which are ninety degrees apart in the dither cycle. Usually, however, only one pickoff signal is received, and an appropriate time delay 32 may be used to obtain the quadrature signal. The time-delayed pickoff signal is a measure of the quadrature or out-of-phase component of such signal. In practice, the time delay need not be exactly one quarter of the sampling period. It may be, for example, proportional to about seventy degrees of the sampling period. Thus, to obtain an adequate quadrature signal, it is only important that the sine of the angle corresponding to the time delay be near 1.00. To correct the gyro signal, the pickoff signal and its time-delayed signal are each differentiated by differentiators 26 and 34, and the differentiated signals are added in summer 38 to produce pulses to be subtracted in summer 28 from the output pulses of the gyro 20 to produce a compensated gyro output signal at 30. The compensated gyro output signal is further processed to produce feedback signals for modifying the pickoff signal.

The compensated gyro output signal is connected into two feedback channels, a first one for the pickoff signal channel and a second one for the delayed pickoff signal channel. Except for a slight predetermined offset signal inserted at 50 into the pickoff signal feedback channel to compensate for true mechanical oscillation of the instrument base, the two feedback channels are substantially identical.

The compensated gyro output signal 30 is fed into the multiplier 40 where it is demodulated with the in-phase reference pickoff signal generated by differentiator 26. The output of the multiplier 40 is summed down in a reset integrator 42. Multiplier 40 and integrator 42 form a digital in-phase demodulator 43 which provides a measure of the in-phase dither content of the compensated gyro output 30.

Similarly, the compensated gyro output signal 30 is fed into the multiplier 54 where it is demodulated with the quadrature reference pickoff signal generated by the time delay 53 which delays the in-phase dither signal produced by differentiator 26. The output of the multiplier 54 is summed down in a reset integrator 56. Multiplier 54 and integrator 56 form a digital quadrature demodulator 57 which provides a measure of the quadrature dither content of the compensated gyro output 30.

The demodulated signals delivered by demodulators 43 and 57 are periodically sampled, and integrators 42 and 56 are reset at the lower rate F2. An offset 50 is added to the in-phase demodulated signal by summer 52. The offset prevents the feedback loop from entirely nulling the dither signal, which is necessary because the mounting base of the gyro exhibits true dither induced motion that is produced by reaction torques from the gyro dither drive (not shown). Offset 50 is usually a constant which is determined from the mass properties of the mechanical structures (not shown) that are involved in the dither motion.

The signal from summer 52 is scaled by a gain term in scaler 46. The scaler 46 can be a binary shift device or a multiplier, or a combination of such devices. The gain of the scaler 46 sets the time constant of the feedback loop. The integrated signal, denoted Kp, is produced by summer 48, and it is the estimate of the in-phase dither pickoff scale factor which is fed back to the direct processing multiplier 24. Those familiar in the art recognize the in-phase loop so-described as a feedback process with integral gain. The loop tracks the in-phase dither pickoff scale factor.

Similarly the sampled output of quadrature demodulator 57 is scaled through a quadrature scaler 58 into a summer 60 which acts as an integrator. The scaler can be a binary shifter, a multiplier, or a combination of the two apparatus. The value of the scaling of the scaler 58 sets the time constant of the quadrature loop. The integrated signal, denoted Kq, is created by summer 60, and it is the best estimate of the quadrature dither pickoff scale factor that is fed back to the quadrature processing multiplier 36. Those familiar in the art recognize the quadrature loop so described as a feedback process with integral gain. The loop tracks the quadrature dither pickoff scale factor.

With both the direct and quadrature loops enabled, both amplitude and phase variations of the dither pickoff scale factor are accounted for, and the gyro is properly compensated to subtract the motion of the gyro frame 10 relative to its mounting post 13 in the compensated gyro output 30.

THE INVENTION

When substantially constant or low frequency angular velocities are being sensed, should such long-term signals travel through the feedback loops, the error signal can build up in the feedback loop and can overflow. The entire correction servo can become biased, convergence can be slowed or instability can result. To prevent low frequency or slowly changing angular motion signals from affecting the feedback loop signals of the apparatus, it is contemplated by this invention to insert a differentiator or high pass filter 62 between the compensated output signal at 30 and the inputs to the feedback loops at the multipliers 40 and 54.

Thus, insertion of the single high pass filter or differentiator can make the difference between an operative and a non-operative correction circuit.

The differentiator 62 can be implemented simply as the difference between the current (k)th sample value and the next previous (k−1)th sample value or, preferably between the (k)th sample value and the value of the (k−2)th sample. The timing relationships with the deliberate quadrature inducing delays of time delays 32 and 53 permit faster convergence. In addition, the high pass characteristic of the differentiator vastly improves immunity from constant or low frequency angular rate inputs while enhancing sensitivity to dither signals, which permits better observation of the error signal and leads to superior pickoff gain and phase tracking ability in the feedback loops. Due to the low frequency attenuation performed by the differentiator 62, the values provided to the feedback path remain, in a mathematical sense, bounded and well behaved. It is therefore possible to implement most of the loops in single precision arithmetic without risking overflow problems. This greatly reduces the burden of computation.

Figure 3:
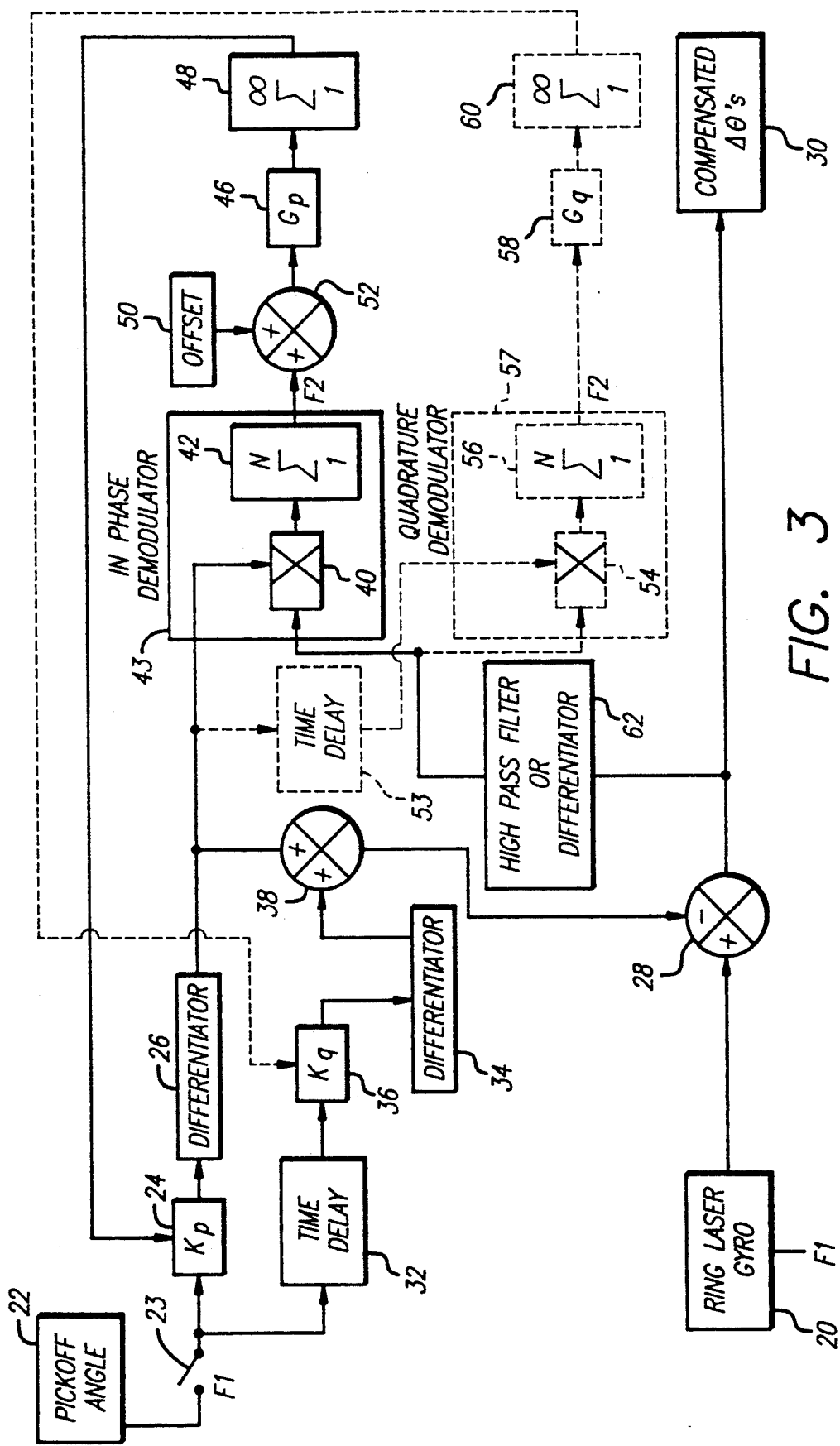
FIG. 3 is a controller according to FIG. 2 with the added differentiator or high pass filter inserted according to this invention.

In the preferred embodiment of the invention, the loops shown in FIG. 3 are preferably implemented in a microprocessor, and the compensation is cost effective, stable, and highly accurate. However, analog or digital circuits may be used, for the invention is not intended to be limited to the specific embodiment described herein, but only by the appended claims taken together with that description.

We claim:

1. In combination:
   a dithered ring laser gyro, including a support for said gyro and a pickoff between said gyro and said support for producing a first dither signal of angular measure between said support and said gyro;
   means responsive to said first dither signal for producing a second dither signal having a quadrature component;
   means for producing an output signal from said gyro;
   first combining means for combining said first dither signal and said second dither signal producing a combined dither output signal and second combining means using said combined dither signal to subtract the effects of both of said dither signals from said output signal to produce a compensated output signal;
   feedback means, responsive to said first dither signal and said second dither signal and to said compensated output signal, configured to control said dither signals to control the gain and phase of said combined signal; and
   a high pass filter in the path between said compensated output signal and said feedback means.

2. Apparatus as recited in claim 1 in which said means for producing a second dither signal comprises a time delayed dither signal.

3. Apparatus as recited in claim 2 in which said first means for combining said first dither signal with said second dither signal comprises:
   a first differentiator, configured to receive said first dither signal;
   a second differentiator, configured to receive said time-delayed dither signal; and
   said first combining means for summing the output signals of said first and second differentiators.

4. Apparatus as recited in claim 3 in which said first and second combining means are summing means, and said second summing means is configured to subtract the combined dither output signal of said first summing means from the output signal of said gyro.

5. Apparatus as recited in claim 4 in which said feedback means comprises principal and quadrature feedback channels, each of said channels comprising:
   multiplying means and a reset summer integrator forming a demodulator;
   a feedback gain controller, and a cumulative summer integrator;
   reference signals driving said demodulator for said principal feedback channel and the demodulator for said quadrature feedback channel being in at least near quadrature.

6. Apparatus as recited in claim 5 in which:
   a principal feedback loop signal is delivered to a first gain controller to adjust the gain of a pickoff signal delivered to said first differentiator; and
   a quadrature feedback loop signal is delivered to a second gain controller to adjust the gain of a second dither signal delivered to said second differentiator.

7. Apparatus as recited in claim 6 and further comprising means for adding an offset signal into said principal feedback loop.

8. In combination:
   a dithered ring laser gyro, including a support for said gyro and a pickoff between said gyro and said support for producing a first dither signal of angular measure between said support and said gyro;
   means responsive to said dither signal for producing a second dither signal having a quadrature component;
   means for producing an output signal from said gyro;
   first combining means for combining said first dither signal and said second dither signal producing a combined dither output signal and second combining means using said combined dither signal to subtract the effects of both of said dither signals from said output signal to produce a compensated output signal;
   feedback means, responsive to said first dither signal and said second dither signal and to said compensated output signal, configured to control the gain and phase of said combined signal; and
   a first differentiator in the path between said compensated output signal and said feedback means.

9. Apparatus as recited in claim 8 in which said means for producing a second dither signal comprises a time delayed dither signal.

10. Apparatus as recited in claim 9 in which said first means for combining said first dither signal with said second dither signal comprises:
    a second differentiator, configured to receive said first dither signal;
    a third differentiator, configured to receive said time-delayed dither signal; and
    said first combining means for summing the output signals of said second and third differentiators.

11. Apparatus as recited in claim 10 in which said first and second combining means are summing means, and said second summing means is configured to subtract the combined dither output signal of said first summing means from the output signal of said gyro.

12. Apparatus as recited in claim 11 in which said feedback means comprises principal and quadrature feedback channels, each of said channels comprising:
    multiplying means and a reset summer integrator forming a demodulator;
    a feedback gain controller, and a cumulative summer integrator;
    reference signals driving said demodulator for said principal feedback channel and the demodulator for said quadrature feedback channel being in at least near quadrature.

13. Apparatus as recited in claim 12 in which:
a principal feedback loop signal is delivered to a first gain controller to adjust the gain of a pickoff signal delivered to said second differentiator; and
a quadrature feedback loop signal is delivered to a second gain controller to adjust the gain of a second dither signal delivered to said third differentiator.

14. Apparatus as recited in claim 13 and further comprising means for adding an offset signal into said principal feedback loop.

* * * * *